(12) United States Patent
Bachman et al.

(10) Patent No.: US 10,746,378 B2
(45) Date of Patent: Aug. 18, 2020

(54) OPTICAL INDICATOR OF MECHANICAL STATE

(71) Applicant: Textron Aviation Inc., Wichita, KS (US)

(72) Inventors: Timothy James Bachman, Wichita, KS (US); Joseph Allan Smarsh, Andale, KS (US)

(73) Assignee: Textron Innovations, Inc., Providence, RI (US)

( * ) Notice: Subject to any disclaimer, the term of this patent is extended or adjusted under 35 U.S.C. 154(b) by 79 days.

(21) Appl. No.: 15/717,412

(22) Filed: Sep. 27, 2017

(65) Prior Publication Data

US 2018/0119926 A1 May 3, 2018

Related U.S. Application Data

(60) Provisional application No. 62/413,662, filed on Oct. 27, 2016.

(51) Int. Cl.
| | |
|---|---|
| *F21V 8/00* | (2006.01) |
| *F21V 14/00* | (2018.01) |
| *G02B 6/00* | (2006.01) |
| *B64D 45/00* | (2006.01) |
| *F21S 19/00* | (2006.01) |
| *F21V 14/08* | (2006.01) |
| *G08B 5/00* | (2006.01) |
| *E05B 41/00* | (2006.01) |
| *B64C 1/14* | (2006.01) |
| *E05B 17/10* | (2006.01) |

(52) U.S. Cl.
CPC ............ *F21V 14/08* (2013.01); *B64C 1/1423* (2013.01); *B64C 1/1461* (2013.01); *B64D 45/0005* (2013.01); *E05B 17/10* (2013.01); *E05B 41/00* (2013.01); *F21S 19/00* (2013.01); *G02B 6/0006* (2013.01); *G08B 5/00* (2013.01); *B64D 45/00* (2013.01); *B64D 2045/007* (2013.01)

(58) Field of Classification Search
None
See application file for complete search history.

(56) References Cited

U.S. PATENT DOCUMENTS

| | | | | |
|---|---|---|---|---|
| 4,091,280 | A * | 5/1978 | Ellis | G01D 5/268 250/227.21 |
| 4,115,754 | A * | 9/1978 | Duzich | G01C 23/00 340/521 |
| 4,796,966 | A * | 1/1989 | Kovaleski | G02B 6/3572 250/227.21 |
| 6,592,077 | B2 | 7/2003 | Uhlemann et al. | |
| 8,033,505 | B2 | 10/2011 | Wieting | |

(Continued)

*Primary Examiner* — Sharon E Payne
(74) *Attorney, Agent, or Firm* — Erise IP, P.A.

(57) ABSTRACT

A mechanical state indicator system concealed within an enclosure includes a light source for providing light and multiple light paths coupled to the light source for directing the light. Each of the light paths includes a gap configured to receive a mechanical state indicator rigidly coupled to a mechanism. Movement of the mechanism between a first state and a second state moves the mechanical state indicator into and out of the gap. Readouts are coupled to each of the light paths for displaying an indication of mechanical state based on a position of a respective mechanical state indicator. The readouts are co-located for collective viewing.

17 Claims, 10 Drawing Sheets

(56) References Cited

U.S. PATENT DOCUMENTS

| | | |
|---|---|---|
| 8,403,265 B2 | 3/2013 | Gowing et al. |
| 8,899,524 B2 | 12/2014 | Gowing et al. |
| 2014/0347674 A1 | 11/2014 | Anderson |

\* cited by examiner

OPTICAL INDICATOR OF MECHANICAL STATE

CROSS-REFERENCE TO RELATED APPLICATIONS

This application claims the benefit of U.S. Provisional Application No. 62/413,662 entitled "Optical Indicator of Mechanical State" filed on Oct. 27, 2016, which is herein incorporated by reference in its entirety.

BACKGROUND

1. Field

Embodiments of this disclosure relate generally to systems for visually verifying a mechanical state (e.g., open/closed, locked/unlocked, etc.), and more specifically to systems for verifying a mechanical state of an aircraft door.

2. Description of Related Art

U.S. Patent to Publication 2014/0347674 to Anderson discloses a fiber optic position sensor for sensing a position of a door. A prism directs light from a multi-mode optical fiber towards a light beam reflector. The reflector reflects the light back through the prism, a collimating lens, and the multi-mode optical fiber to an optical transceiver, which receives the reflected light and transmits an electrical signal to an indicator. A plunger coupled to the door intercepts the reflected light, which changes the electrical signal to the indicator.

U.S. Pat. No. 6,592,077 to Uhlemann discloses a window for an aircraft door that includes a Fresnel lens located between an inner pane and an outer pane for expanding the field of view for visual inspections.

U.S. Pat. No. 8,033,505 to Wieting discloses an airplane door window that includes an intermediate pane designed as an optical lens body for enlarging the field of view for visual inspections.

SUMMARY

In an embodiment, an optical indicator system is provided. The system includes a mechanism pivotable between a first position and a second position, a light path optically coupling a light source to an indicator for transmission of light from the light source for illuminating the indicator, and an intervening member rigidly coupled to the mechanism such that pivoting of the mechanism from the first position to the second position pivots the intervening member to intercept the light path for altering transmission of light to the indicator.

In another embodiment, a mechanical state indicator system is provided. The system includes a light source for providing light and a plurality of light paths coupled to the light source for directing the light. Each of the plurality of light paths includes a gap configured to receive a mechanical state indicator rigidly coupled to a mechanism such that movement of the mechanism between a first state and a second state moves the mechanical state indicator into and out of the gap, respectively. The system further includes a plurality of readouts each respectively coupled to the plurality of light paths for displaying an indication of mechanical state based on a gap position of a respective mechanical state indicator.

In yet another embodiment, a system for enabling visual inspection of a mechanism position concealed inside an enclosure is provided. The system includes a light source; an optical display configured to illuminate upon receiving light from the light source; a first optical-fiber cable having a first end and a second end, the first end being coupled to the light source, and the second end configured to emit light from the light source; a second optical-fiber cable having a first end and a second end, the first end being aligned to receive light from the first optical-fiber cable, and the second end being coupled to the optical display; a gap having a predetermined distance between the second end of the first optical-fiber cable and the first end of the second optical-fiber cable; and, an optical indicator mechanically coupled to a mechanism and configured to occupy the gap when the mechanism is in a first position, and to recede from the gap when the mechanism is in a second position, such that the optical indicator alters light from the light source to the optical display when the mechanism is in the first position.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

FAA regulations require provisions for visual inspection of an aircraft door to determine whether or not the door is closed, latched, and locked. The visual inspection provisions are intended to have a high level of integrity and be independent of other remote indications. Conventionally, one or more sight glasses are incorporated into the door to allow a crew member to view the position of mechanical components to determine the status of the latching/locking mechanism (see e.g., FIG. 1, described below). The mechanical components are typically coupled with flags or indicators, which may include decals or paint, to convey the mechanism status information (e.g., locked versus unlocked). Lenses or mirrors may also be employed to view indicators that may be somewhat remote from the sight glasses.

A disadvantage of conventional sight glasses is that the view provided to the crew member often depends on the orientation of the crew member's eye with respect to the sight glass, which may provide an ergonomically unfriendly position or an unclear view of the necessary mechanical components. A plurality of inspection sites may be needed to fully determine the status of the door, requiring the crew member to reposition for viewing each site. Additionally, the viewing requirements may necessitate alteration of otherwise unrelated door components.

Figure 1:
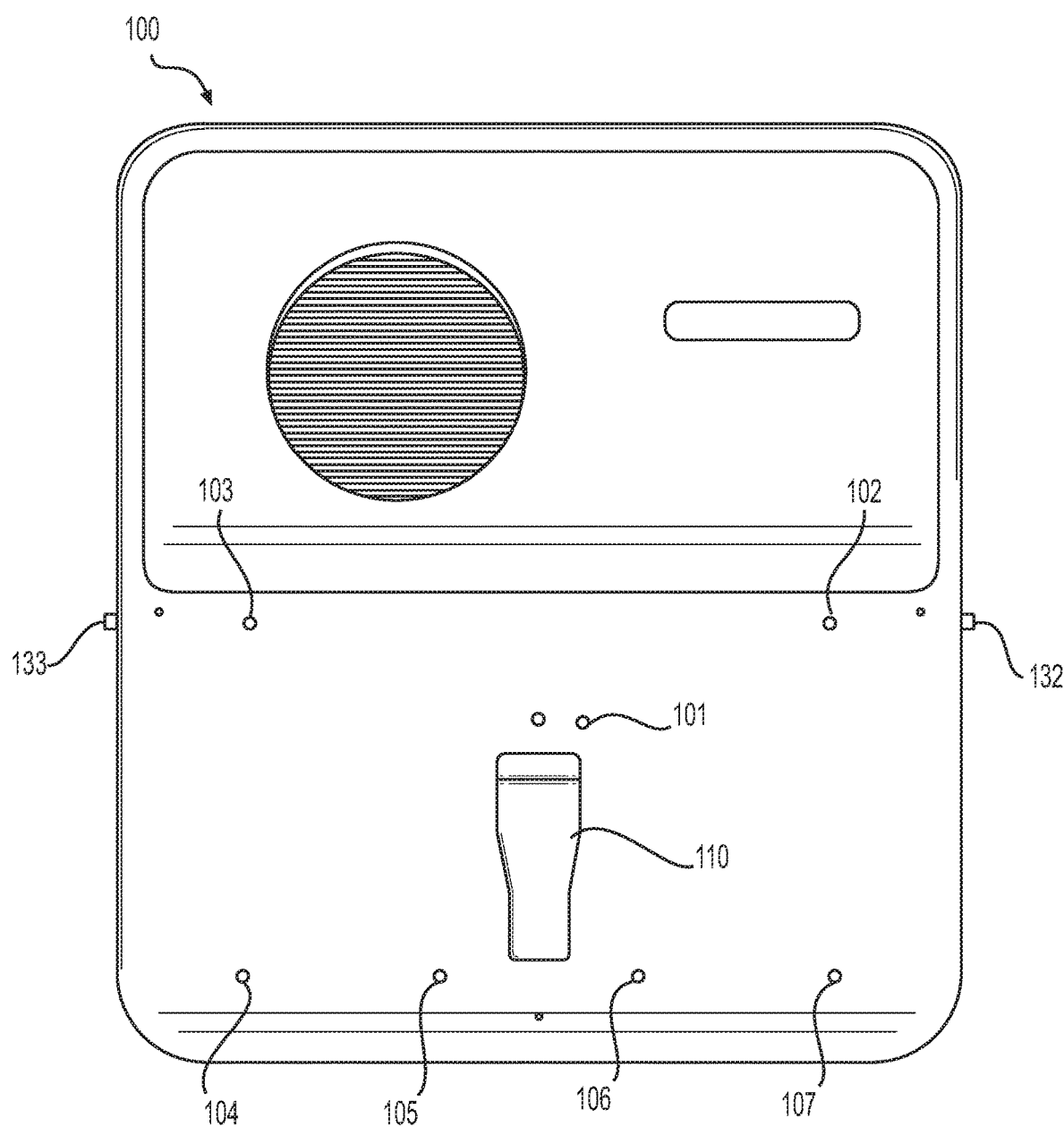
FIG. 1 is a drawing of a conventional aircraft door having a plurality of prior art sight glasses.

FIG. 1 shows a prior art aircraft door 100 having a plurality of sight glasses for viewing a plurality of internal latching and locking mechanisms. In the context of aircraft doors, latching mechanisms restrain aircraft doors in the closed position while locking mechanisms restrain the latching mechanisms in the latched position. Aircraft door 100 includes a first sight glass 101, a second sight glass 102, a third sight glass 103, a fourth sight glass 104, a fifth sight glass 105, a sixth sight glass 106, and a seventh sight glass 107. Each of the seven sight glasses 101-107 include a viewing window to enable a crew member to view an indicator of a respective latching or locking mechanism inside aircraft door 100, as described below in connection with FIG. 2. Due to the locations of the latching and locking mechanisms inside aircraft door 100, the corresponding sight glasses 101-107 are dispersed across the front panel of door 100. The latching and locking mechanisms are actuated via a handle 110, which is recessed and accessible within the front panel.

Figure 2:
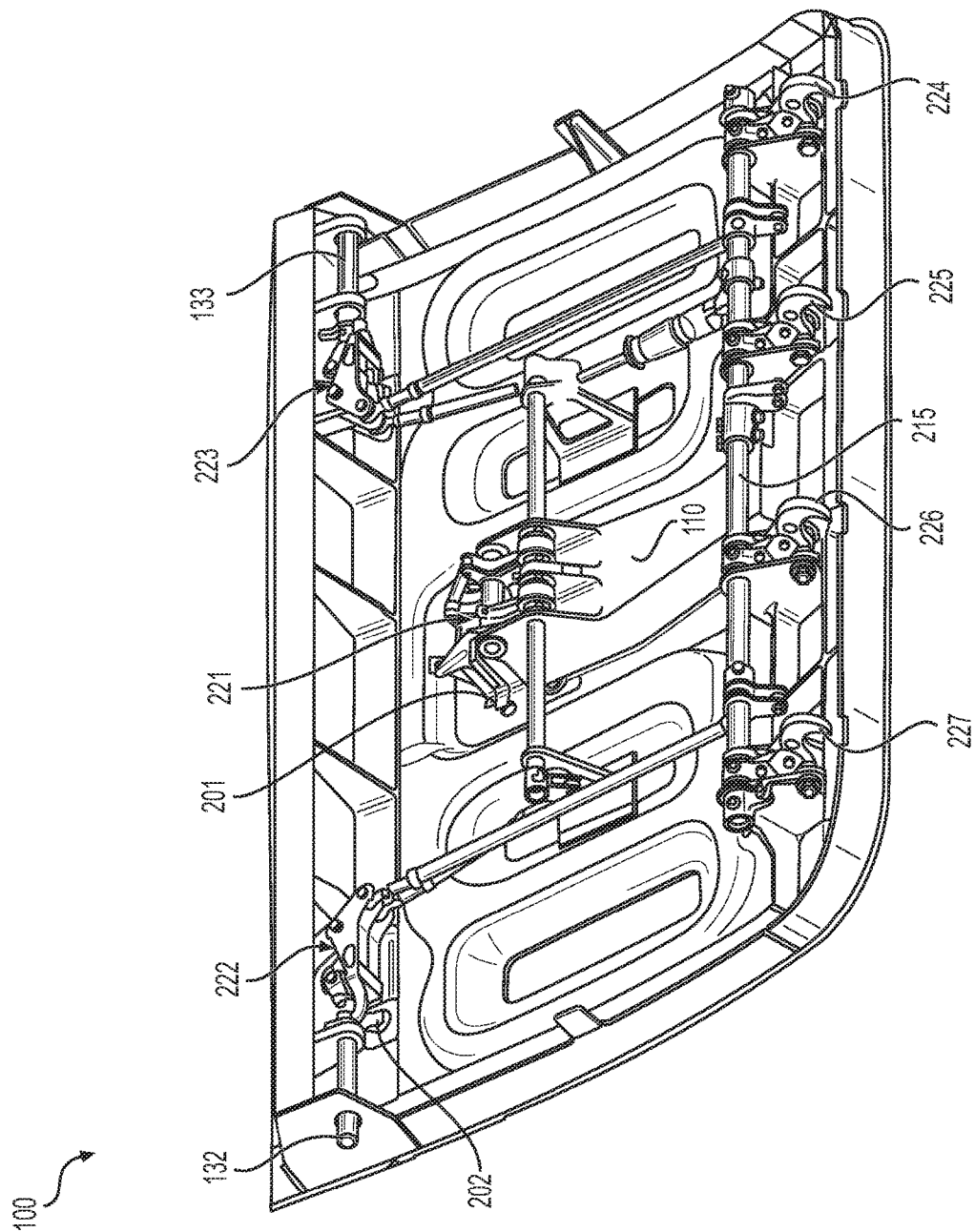
FIG. 2 is a perspective view of the internal portion of the conventional aircraft door of FIG. 1.

FIG. 2 is a perspective view showing an internal portion of conventional aircraft door 100, FIG. 1. Aircraft door 100 includes a plurality of latching and locking mechanisms, each having a respective indicator viewable through a sight glass. For example, a first indicator 201 is viewable through first sight glass 101 and a second indicator 202 is viewable through second sight glass 102. Not all indicators are visible in FIG. 2; however, each of the seven sight glasses 101-107 in FIG. 1 may be configured to view a respective indicator mechanically coupled to a respective latching or locking mechanism.

Example latching and locking mechanisms include a first, second, third, fourth, fifth, sixth and seventh mechanism 221, 222, 223, 224, 225, 226, and 227, respectively. First locking mechanism 221 pivots between locked and unlocked positions via handle 110. Second and third latching mechanisms 222, 223 operate via a retractable bar 132, 133, respectively. Each retractable bar 132, 133 is actuated by a transverse rod 215 that is fixed to, and rotates with the lower portion of handle 110. The bars 132 and 133 each extend laterally out from opposite sides of aircraft door 100 where they are received into receptacles defined into an adjacent door frame (not shown) for latching thereto, and may be withdrawn from the receptacles for unlatching upon actuation of handle 110. Fourth, fifth, sixth, and seventh latching mechanisms 224-227 include a hook that may pivot for latching and unlatching aircraft door 100. All seven latching and locking mechanisms 221-227 may be mechanically coupled together, thereby enabling a coordinated transition between latched/locked and unlatched/unlocked positions via a single interface, such as a handle or lever operable by a crew member (e.g., handle 110, FIG. 1). However, the latching and locking mechanisms 221-227 are spaced apart by relatively substantial distances, which prevents viewing the respective sight glasses 101-107 from a single vantage point. Instead, a user has to move from one sight glass to the next to view the respective indicators.

Figure 3:
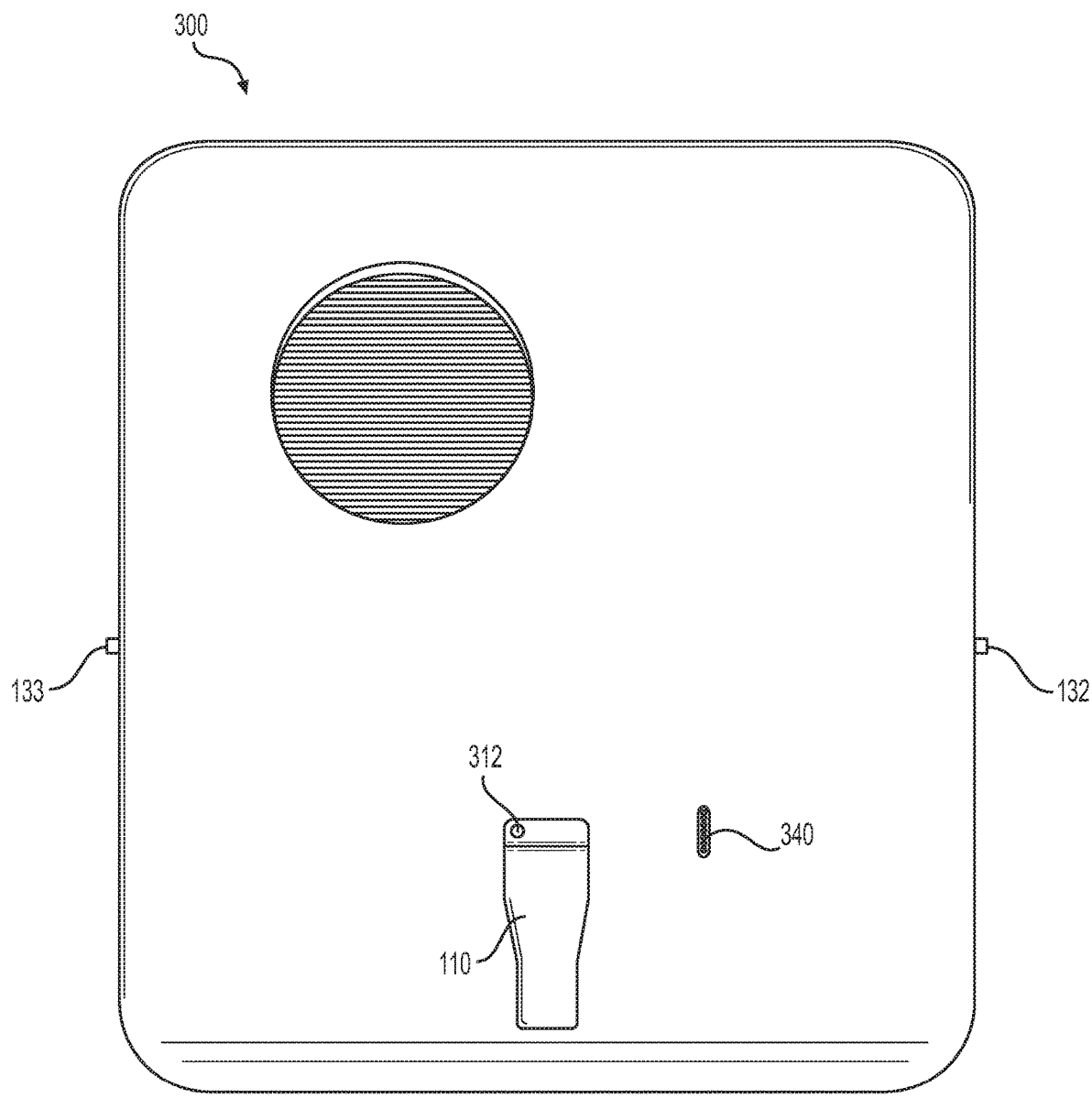
FIG. 3 shows an aircraft door having an optical display for displaying optical indicators of mechanical state, in an embodiment.

FIG. 3 shows an exemplary aircraft door 300 having an optical display 340 for displaying optical indicators of mechanical state. Optical display 340 is for example a display for viewing with multiple indicators or readouts that provides rapid visual inspection of multiple mechanisms via respective light paths. Aircraft door 300 is an example of aircraft door 100, FIG. 1 with the prior art sight glasses 101-107 replaced by optical display 340. A key lock 312 enables locking and unlocking of handle 110 via a key.

Figure 4:
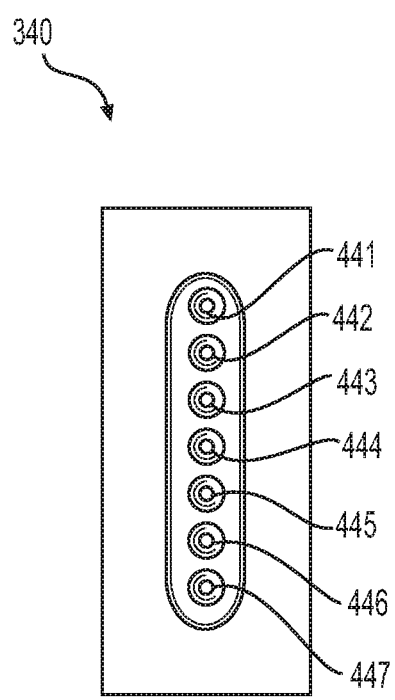
FIG. 4 shows the optical indicator of FIG. 3 in further exemplary detail.

FIG. 4 shows optical display 340, FIG. 3 in further exemplary detail. Optical display 340 may include a plurality of individual displays each coupled to an indicator of mechanical state, as further described below in connection with FIGS. 5-10. For example, optical display 340 may include a first display 441, a second display 442, a third display 443, a fourth display 444, a fifth display 445, a sixth display 446, and a seventh display 447 corresponding to seven optical indicators, each mechanically coupled to one of seven latching and locking mechanisms, as further described below in connection with FIG. 5. Each of optical displays 441-447 may include a display lens and/or a color filter. All seven optical displays 441-447 may be viewed from a single vantage point despite the respective latching and locking mechanisms being spaced apart and concealed from view within the enclosure of door 300.

Figure 5:
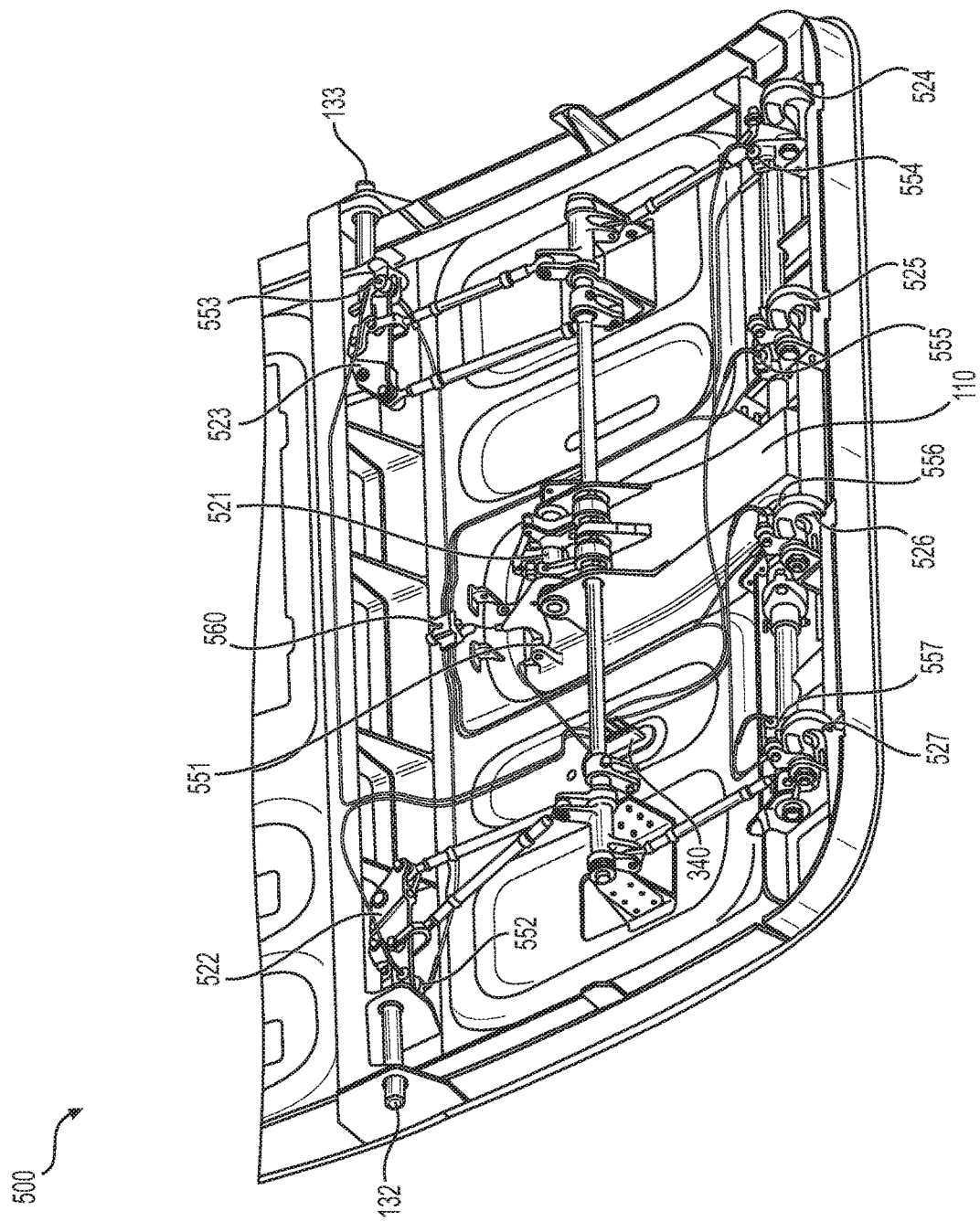
FIG. 5 is a perspective view showing an internal portion of the aircraft door of FIG. 3.

FIG. 5 is a perspective view showing an internal portion of aircraft door 500. Aircraft door 500 is an example of aircraft door 200, FIG. 2 with the prior art sight glasses 101-107 replaced by optical display 340. Coupled to optical display 340 is a plurality of fiber-optic paths, each configured to provide a light path between a light source 560 and optical display 340 via an indicator of mechanical state. For example, first, second, third, fourth, fifth, sixth, and seventh mechanical state indicator 551, 552, 553, 554, 555, 556, and 557 are each configured to provide an indication of the mechanical state of a respective first, second, third, fourth, fifth, sixth, and seventh mechanism 521, 522, 523, 524, 525, 526, and 527. An exemplary fiber-optic path is described below in connection with FIG. 6.

Light source 560 may provide natural and/or artificial light. In certain embodiments, light source 560 is an electrically powered light such as a light-emitting diode (LED). The electrically powered light source may provide white light or a colored light, without departing from the scope hereof. In other embodiments, light source 560 is a natural light source provided by a window or lens exposed to the exterior of the aircraft such that no electrical power is required to operate the optical indicator of mechanical state. In yet another embodiment, light source 560 may be configured to provide both a natural light source and an electrically powered light such that nominal operation of the optical indicator relies substantially on the electrically powered light source, but in the event of a failure, backup operation relies on the natural light source.

Figure 6:
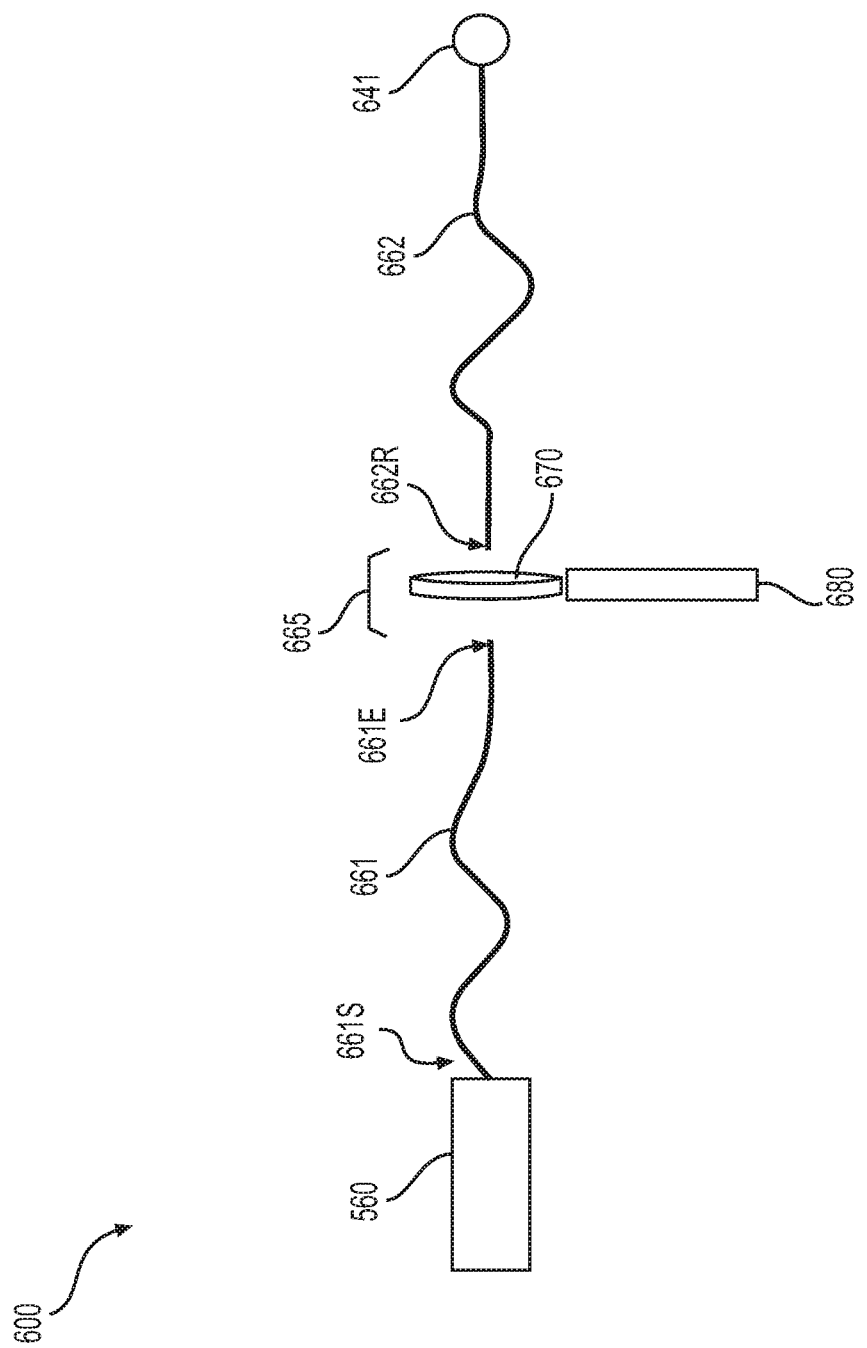
FIG. 6 shows a fiber-optic path used with an optical indicator of mechanical state, in an embodiment.

FIG. 6 shows an exemplary fiber-optic path 600 used with an optical indicator of mechanical state. Fiber-optic path 600 is an example of a light path that serves to direct light from light source 560 to optical display 340. Other light paths are contemplated including those formed of mirrors, for example, without departing from the scope hereof. Other embodiments of fiber optic path 600 are described below in connection with FIGS. 7-10.

Fiber optic path 600 includes a first optical fiber cable 661, a gap 665, and a second optical fiber cable 662. First optical fiber cable 661 is configured as a light conduit for carrying light from a source end 661S optically coupled to light source 560, to an emission end 661E. Second optical fiber cable 662 is configured as a light conduit for receiving light with a receiving end 662R and carrying light to an optical display 641, which is an example of first optical display 441, FIG. 4. Emission end 661E and receiving end 662R are aligned to limit loss of light as it spreads across gap 665. Gap 665 is configured to receive a mechanical state indicator 670 that may intervene with the light emitted from emission end 661E. A mechanism 680 is rigidly coupled to mechanical state indicator 670 such that when mechanism 680 moves, mechanical state indicator 670 is moved in and out of gap 665.

In operation, light travels from light source 560 through first optical fiber cable 661, across gap 665, into receiving end 662R of second optical fiber cable 662 to optical display 641. When mechanical state indicator 670 is located in gap 665, the light emitted from emission end 661E is intercepted by mechanical state indicator 670. When mechanism 680 moves causing mechanical state indicator 670 to vacate gap 665, light passes unencumbered from emission end 661E to receiving end 662R.

In certain embodiments, when mechanism 680 is in a latched/locked state, mechanical state indicator 670 is located in gap 665. Otherwise, latching mechanism 680 is in an unlatched/unlocked state and mechanical state indicator 670 is positioned outside of gap 665 such that light from light source 560 passes unencumbered across gap 665. In other embodiments, the opposite configuration is employed in which mechanical state indicator 670 is positioned outside gap 665 when mechanism 680 is in the unlatched/unlocked state. Latching and locking mechanisms 521-527, FIG. 5 are embodiments of mechanism 680.

In certain embodiments, mechanical state indicator 670 is a transparent or semi-transparent filter that selectively filters light from light source 560. For example, mechanical state indicator 670 may be a low-pass filter, a high-pass filter, or a bandpass filter. Thus, the filter may be configured to provide light of a desired wavelength range (e.g., a desired color). In an embodiment, light source 560 provides white light and mechanical state indicator 670 provides a bandpass filter that allows only green light to pass, such that optical display 641 appears green when mechanical state indicator 670 is located in gap 665. In an alternative embodiment, the filter is replaced with an opaque material such that light from light source 560 is blocked when mechanical state indicator 670 is located in gap 665, such that optical display 641 is either lit or unlit to convey the mechanical state. In yet another embodiment, a plurality of filters may be associated with mechanical state indicator to indicate a plurality of respective mechanical states by color. Additional filters may also be located at light source 560 and/or at display 641 without departing from the scope hereof.

Figure 7:
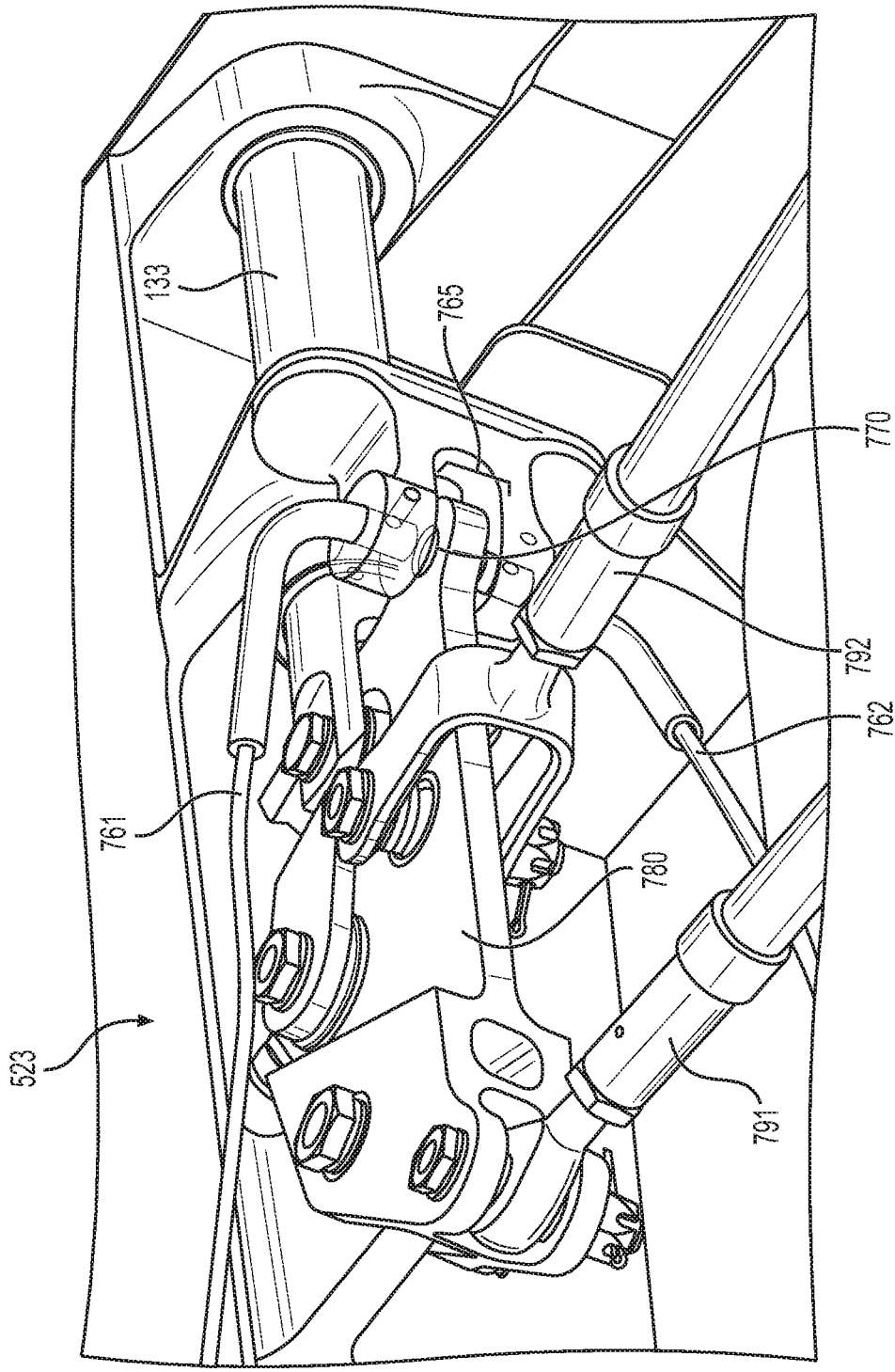
FIG. 7 is a perspective view showing a latching mechanism incorporating an optical indicator of mechanical state, in an embodiment.
Figure 8:
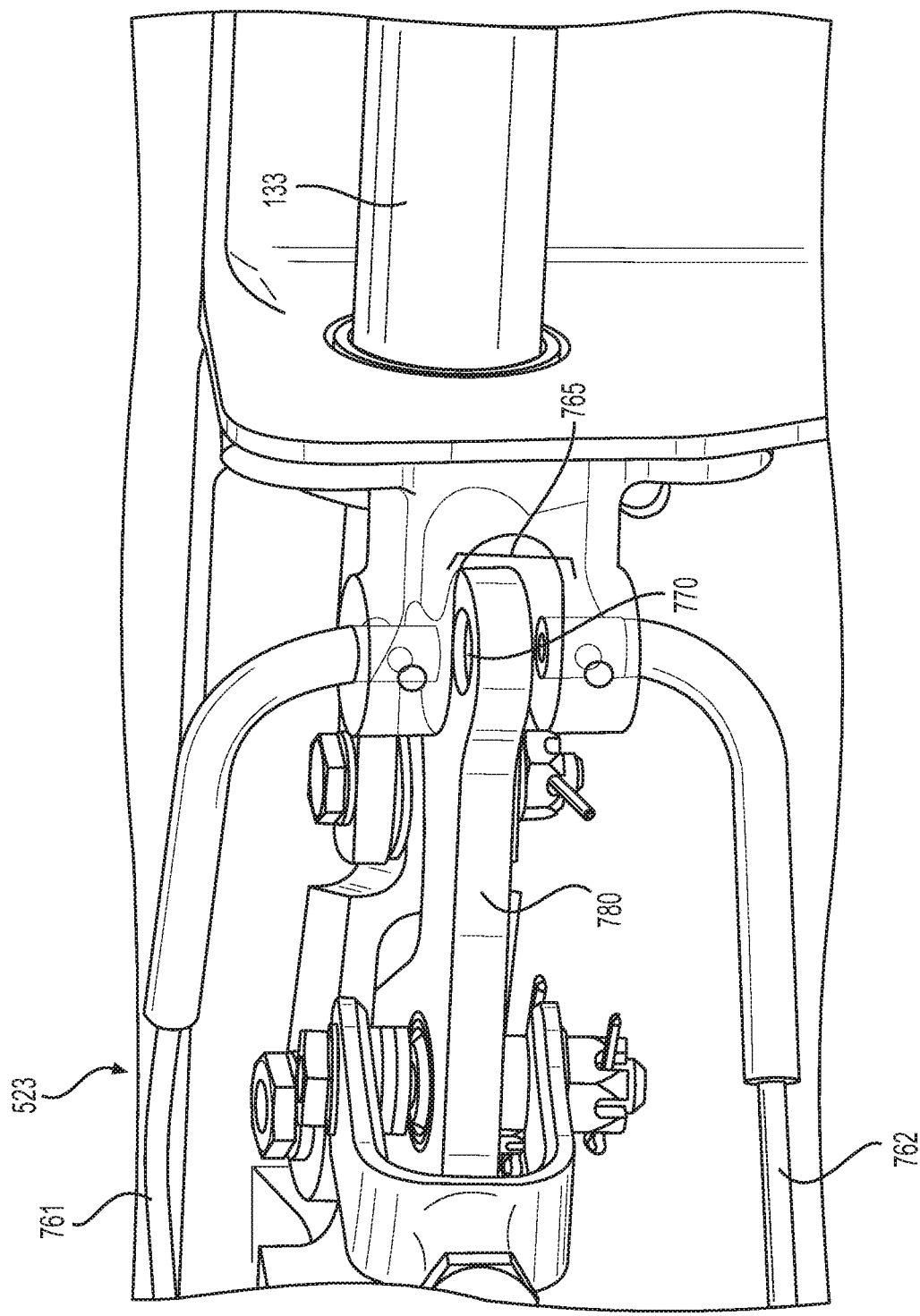
FIG. 8 is a perspective view showing the latching mechanism of FIG. 7 in further exemplary detail.

FIGS. 7 and 8, which are perspective views showing further detail of third latching mechanism 523, FIG. 5, are best viewed together with the following description. Third latching mechanism 523 includes a lever arm 780 with an embedded mechanical state indicator 770. A first optical fiber cable 761, which is an example of first optical fiber cable 661 of FIG. 6, directs light through indicator 770 to a second optical fiber cable 762, which is an example of second optical fiber cable 662, FIG. 6. A first stay 791 and a second stay 792 are configured to rotate and counter-rotate lever arm 780, respectively, such that bar 133 extends and retracts between latched and unlatched positions. Mechanical state indicator 770 moves in and out of gap 765 in coordination with the rotation/counter rotation of lever arm 780 and extension/retraction of bar 133. When positioned inside gap 765 (as depicted in FIGS. 7 and 8), mechanical state indicator 770 filters light from first optical fiber cable 761, and when positioned outside gap 765, light from optical fiber cable 761 passes across gap 765 unfiltered.

Figure 9:
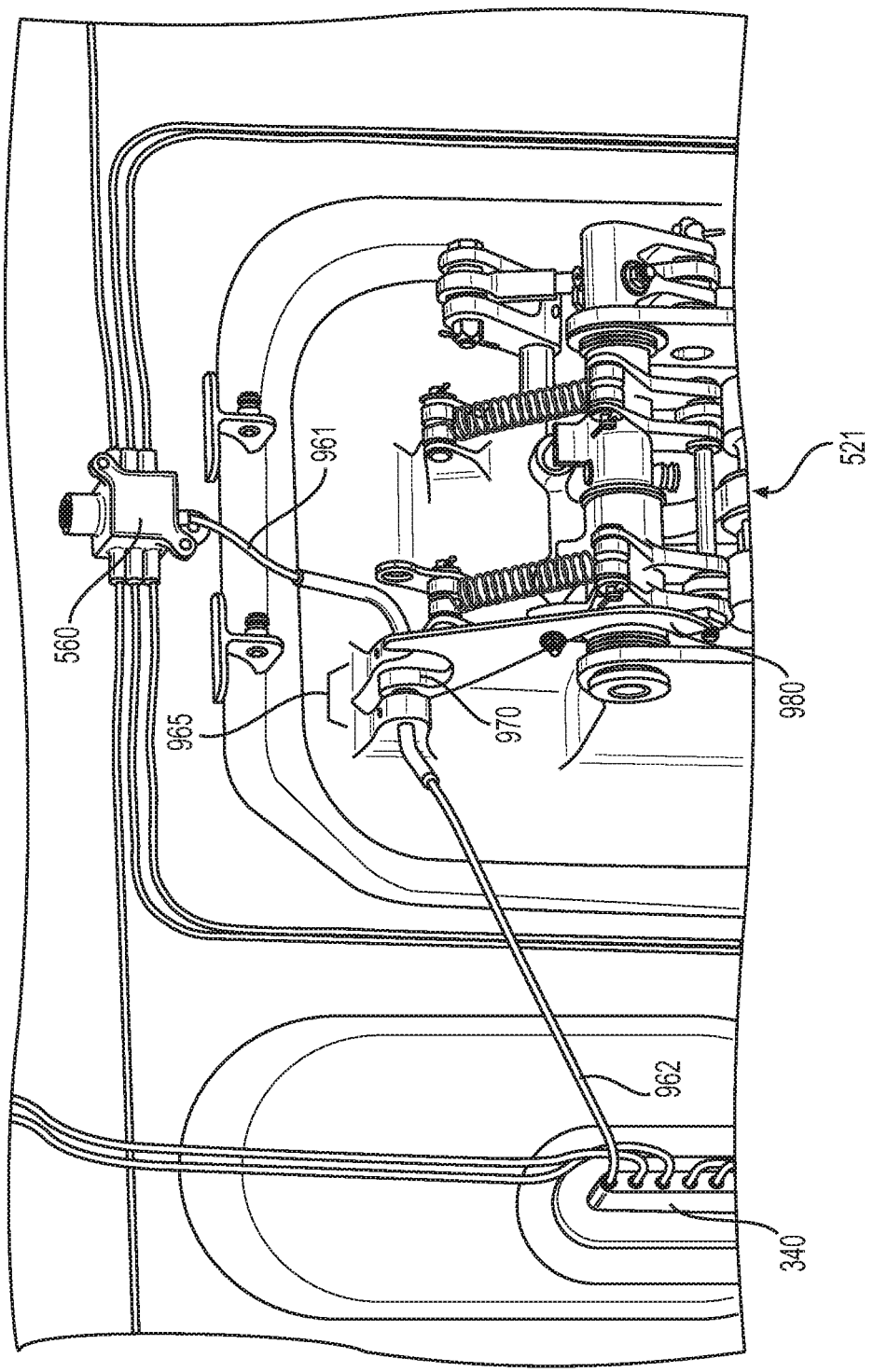
FIG. 9 is a perspective view showing another embodiment of a locking mechanism having an optical indicator of mechanical state.
Figure 10:
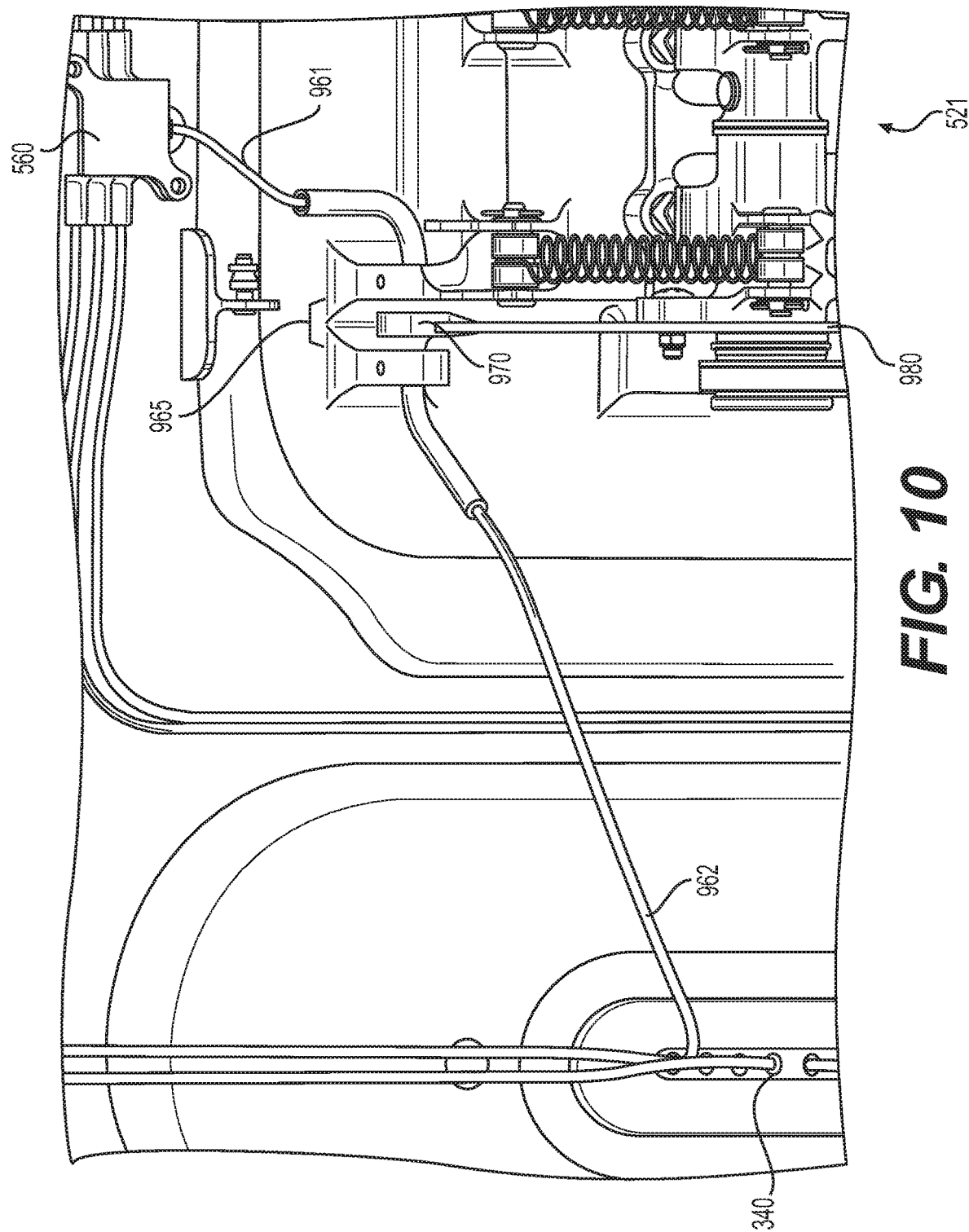
FIG. 10 is a perspective view showing the locking mechanism of FIG. 9 in further exemplary detail.

FIGS. 9 and 10, which are perspective views showing further detail of first locking mechanism 521, FIG. 5, are best viewed together with the following description. First locking mechanism 521 includes a lever arm 980 with an embedded mechanical state indicator 970. A first optical fiber cable 961, which is an example of first optical fiber cable 661 of FIG. 6, directs light through indicator 970 to a second optical fiber cable 962, which is an example of second optical fiber cable 662 of FIG. 6, and further to optical display 340. When first locking mechanism is in a locked state, lever arm 980 rotates causing indicator 970 to occupy gap 965 (as depicted in FIGS. 9 and 10), thereby indicating that first locking mechanism 521 is in a locked state via optical display 340. When first locking mechanism 521 is in an unlocked state, lever arm 980 counter-rotates such that indicator 970 retracts outside gap 965 allowing light to pass unfiltered to display 340.

Advantages of the presently disclosed embodiments include that each individual latching and locking mechanism may be independently verified as opposed to a single indicator for an entire door. The optical fiber cables enable optical display 340 to be conveniently located for viewing, even if the latching and locking mechanisms being monitored are somewhat dispersed. Optical display 340 provides an unambiguous signal change (e.g., a color change) when each latching and locking mechanism transitions between latched/locked and unlatched/unlocked states. A high level of integrity is provided since failure modes result in a loss of indication rather than a misleading indication. Complicated lens systems and electronic equipment (except for the light source) are avoided.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. An optical indicator system for an aircraft door, comprising:
   a locking mechanism pivotable between a first position for locking the aircraft door and a second position for unlocking the aircraft door;
   a fiber optic path optically coupling a light source to an indicator, such that light from the light source is transmitted through the fiber optic path to illuminate the indicator;
   an intervening member rigidly coupled to the locking mechanism such that pivoting of the mechanism from the first position to the second position pivots the intervening member; and
   a gap within the fiber optic path for receiving the intervening member such that light travels unencumbered across the gap when the intervening member is positioned outside the gap, and light is altered when the intervening member is pivoted into the gap.

2. The optical indicator system of claim 1, wherein the intervening member comprises a filter for filtering light from the light source when the intervening member is positioned within the gap.

3. The optical indicator system of claim 1, wherein the indicator is configured to receive light from a plurality of fiber optic paths, each configured for indicating position of a respective one of a plurality of intervening members, each rigidly coupled to a respective one of a plurality of locking mechanisms.

4. The optical indicator system of claim 3, wherein the plurality of mechanisms are concealed within the aircraft door and spaced apart by a distance that prevents direct visual inspection from a single vantage point.

5. A mechanical state indicator system, comprising:
a light source for providing light, wherein the light source comprises 1) an electrically-powered light for nominally providing artificial light and 2) exposure to natural light for providing a backup source of light;
a plurality of fiber optic light paths coupled to the light source for directing the light, wherein each of the plurality of fiber optic light paths comprises a gap configured to receive a mechanical state indicator rigidly coupled to a mechanism, such that movement of the mechanism between a first state and a second state pivots the mechanical state indicator into and out of the gap, respectively; and
a plurality of readouts co-located into a single display, each of the plurality of readouts being respectively coupled to the plurality of fiber optic light paths for displaying an indication of mechanical state based on a gap position of a respective mechanical state indicator.

6. The mechanical state indicator system of claim 5, wherein each of the plurality of fiber optic light paths comprise a first optical fiber separated by a predetermined distance from a second optical fiber to form the gap.

7. The mechanical state indicator system of claim 6, wherein the first optical fiber emits light and the second optical fiber is aligned to receive the light.

8. The mechanical state indicator system of claim 5, wherein the mechanical state indicator comprises a filter for filtering light through the gap such that the color of light received at a respective one of the plurality of readouts changes upon transition from the first state to the second state.

9. The mechanical state indicator system of claim 5, wherein the mechanical state indicator comprises an opaque material for blocking light through the gap such that illumination of a respective one of the plurality of readouts ceases upon transition from the first state to the second state.

10. A system for enabling visual inspection of a plurality of locking mechanisms concealed inside an enclosed aircraft door, comprising:

a light source;
an optical display illuminated via light received from the light source, the optical display comprising a plurality of co-located readouts each corresponding to a respective one of the plurality of locking mechanisms;
a plurality of optical paths each optically coupling the light source with a respective one of the plurality of co-located readouts, each of the optical paths comprising:
a first optical-fiber cable having a first end and a second end, the first end being coupled to the light source, and the second end configured to emit light from the light source;
a second optical-fiber cable having a first end and a second end, the first end being aligned to receive light from the first optical-fiber cable, and the second end being coupled to the optical display;
a gap having a predetermined distance between the second end of the first optical-fiber cable and the first end of the second optical-fiber cable; and
an optical indicator mechanically coupled to a respective one of the plurality of locking mechanisms and configured to occupy the respective gap when the respective locking mechanism is in a first position, and to recede from the gap when the respective locking mechanism is in a second position, such that the optical indicator alters light from the light source to the optical display when the respective locking mechanism is in the first position.

11. The system of claim 10, wherein the first position is a locked position and the second position is an unlocked position of the respective locking mechanism.

12. The system of claim 10, wherein the optical indicator comprises a filter for filtering light from the light source to the optical display corresponding to the first position of the respective locking mechanism.

13. The system of claim 12, wherein the filter is selected from the group consisting of a low-pass filter, a high-pass filter, and a bandpass filter.

14. The system of claim 10, wherein the light source provides white light.

15. The system of claim 12, wherein the filter is a color filter.

16. The system of claim 10, wherein each locking mechanism comprises a plurality of positions and the optical indicator comprises a corresponding plurality of filters to occupy the gap when the locking mechanism is in one of the plurality of positions, respectively, to indicate a plurality of respective mechanical states by a plurality of respective colors.

17. The system of claim 10, wherein the optical indicator is configured to block light from the light source when occupying the gap such that the optical display fails to illuminate when the locking mechanism is in the first position.

* * * * *